(12) United States Patent
Rebelo (10) Patent No.: US 10,445,505 B2
(45) Date of Patent: Oct. 15, 2019

(54) PROCESS VULNERABILITY ASSESSMENT

(71) Applicant: McAfee, LLC, Santa Clara, CA (US)

(72) Inventor: Joshua Cajetan Rebelo, Bangalore (IN)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/493,293

(22) Filed: Sep. 22, 2014

(65) Prior Publication Data
US 2016/0085970 A1 Mar. 24, 2016

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/57* | (2013.01) |
| *G06F 21/34* | (2013.01) |
| *G06F 21/51* | (2013.01) |
| *G06F 21/55* | (2013.01) |
| *G06F 21/56* | (2013.01) |

(52) U.S. Cl.
CPC ............ *G06F 21/577* (2013.01); *G06F 21/34* (2013.01); *G06F 21/51* (2013.01); *G06F 21/554* (2013.01); *G06F 21/566* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| | (Continued) | | |

FOREIGN PATENT DOCUMENTS

| | | |
|---|---|---|
| EP | 2696535 A1 | 2/2014 |
| RU | 2462754 C2 | 9/2012 |
| | (Continued) | |

OTHER PUBLICATIONS

PCT International Search Report and Written Opinion in PCT Application Serial No. PCT/US2015/046816 dated Jan. 28, 2016.
(Continued)

*Primary Examiner* — Lynn D Feild
*Assistant Examiner* — Vadim Savenkov
(74) *Attorney, Agent, or Firm* — Patent Capital Group (57) ABSTRACT

In an example, a vulnerability assessment engine is disclosed. The vulnerability assessment engine may include a shim application and a shim agent. The shim application sits at a relatively low level in an operational stack, such as just above the operating system itself. It may intercept system calls through operating system hooks or other means, so as to determine whether an action taken by an executable object should be allowed. The vulnerability assessment engine sends an identifier, such as a common platform enumeration (CPE)-like string to a server, which queries a database to determine a response code for the action. The response code may indicate that the action should be allowed, blocked, allowed with a warning, or other useful action. A shim agent may also be installed to receive notifications from the server or to query the server for available updates or patches for the executable object.

27 Claims, 5 Drawing Sheets

(56) References Cited

U.S. PATENT DOCUMENTS

| | | | |
|---|---|---|---|
| 6,460,050 B1 | 10/2002 | Pace et al. | |
| 6,745,385 B1* | 6/2004 | Lupu | G06F 9/44521 |
| | | | 717/148 |
| 6,785,732 B1* | 8/2004 | Bates | G06F 21/56 |
| | | | 709/232 |
| 6,986,058 B1* | 1/2006 | Friedman | G06F 21/54 |
| | | | 726/22 |
| 7,367,057 B2* | 4/2008 | Das | G06F 21/566 |
| | | | 712/208 |
| 7,484,245 B1* | 1/2009 | Friedman | G06F 21/52 |
| | | | 380/283 |
| 7,506,155 B1 | 3/2009 | Stewart et al. | |
| 7,845,009 B2* | 11/2010 | Grobman | G06F 21/53 |
| | | | 718/1 |
| 8,015,608 B2* | 9/2011 | LeVine | G06F 21/14 |
| | | | 705/51 |
| 8,220,055 B1* | 7/2012 | Kennedy | G06F 21/50 |
| | | | 726/22 |
| 8,584,094 B2* | 11/2013 | Dadhia | G06F 21/566 |
| | | | 717/126 |
| 8,601,586 B1 | 12/2013 | Boutros et al. | |
| 2004/0177263 A1* | 9/2004 | Sobel | G06F 21/51 |
| | | | 726/22 |
| 2004/0199763 A1 | 10/2004 | Freund | |
| 2006/0106806 A1* | 5/2006 | Sperling | G06F 8/65 |
| 2007/0271610 A1 | 11/2007 | Grobman | |
| 2011/0078795 A1* | 3/2011 | Liu | G06F 11/2294 |
| | | | 726/23 |
| 2011/0093953 A1* | 4/2011 | Kishore | G06F 21/568 |
| | | | 726/24 |
| 2012/0110174 A1* | 5/2012 | Wootton | G06F 21/564 |
| | | | 709/224 |
| 2013/0283377 A1* | 10/2013 | Das | G06F 21/51 |
| | | | 726/23 |
| 2014/0157355 A1* | 6/2014 | Clancy, III | G06F 21/53 |
| | | | 726/1 |
| 2014/0189873 A1* | 7/2014 | Elder | G06F 21/577 |
| | | | 726/25 |
| 2014/0237250 A1 | 8/2014 | Menezes et al. | |

FOREIGN PATENT DOCUMENTS

| | | |
|---|---|---|
| WO | 2014130472 A1 | 8/2014 |
| WO | 2016048536 A1 | 3/2016 |

OTHER PUBLICATIONS

International Preliminary Report on Patentability issued in PCT Application No. PCT/US2015/046816 dated Mar. 28, 2017; 11 pages.

* cited by examiner

PROCESS VULNERABILITY ASSESSMENT

FIELD OF THE DISCLOSURE

This application relates to the field of computer security, and more particularly to assessing potential vulnerability of an executable object.

BACKGROUND

Computer security is an important issue, and its importance increases as interconnectivity between computing devices increases. In one example of a traditional security architecture, an antivirus or antimalware agent periodically scans a computer hard drive to determine whether there are executable objects installed on the machine that match a profile of a known malicious object. A user may also manually install updates for executable objects as they become available, or a security administrator may "push" out updates as they become available.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

In an example, a vulnerability assessment engine is disclosed. The vulnerability assessment engine may include a shim application and a shim agent. The shim application sits at a relatively low level in an operational stack, such as just above the operating system itself. It may intercept system calls through operating system hooks or other means, so as to determine whether an action taken by an executable object should be allowed. The vulnerability assessment engine sends an identifier, such as a common platform enumeration (CPE)-like string to a server, which queries a database to determine a response code for the action. The response code may indicate that the action should be allowed, blocked, allowed with a warning, or other useful action. A shim agent may also be installed to receive notifications from the server or to query the server for available updates or patches for the executable object.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

This Specification describes a vulnerability assessment engine operable for intercepting any action by or associated with an executable object such as a launch, read, write, memory access, updating system files, deleting system files, reading files belonging to another application, changing files belonging to another application, accessing, reading, writing, updating, or deleting a registry entry or configuration file, periodically contacting a remote server, providing system-related information to a remote server, downloading a file from a remote server, installing a file downloaded from a remote server, preloading, prefetching, or similar.

Upon intercepting the action, the vulnerability assessment engine may assign the action a reputation specific to the executable object performing it. Thus, for example, an executable object called "process.exe" may not have a single, monolithic reputation assigned to it that either allows all actions or blocks all actions. Rather, each action that "process.exe" performs may have a separate reputation.

If "process.exe" is a reputable file performing only actions it has been authorized to perform, the vulnerability assessment engine operates seamlessly and invisibly to the end user. The executable object is permitted to perform its tasks, and the user need not be bothered. On the other hand, if "process.exe" is a "grayware" application that performs some legitimate functions, but also exhibits undesirable behavior, certain actions may be blocked. For example, if "process.exe" is a flashlight application for a mobile phone, it may have a legitimate interest in accessing hardware and software such as the flash, and possibly even legitimately download and display advertisements to support development. But if the process also exhibits more troublesome behavior, such as culling contacts and personal information on a mobile phone and attempting to upload that information to a remote server, the vulnerability assessment engine may intervene.

Each action may have a reputation that falls on a spectrum with a granularity appropriate to the context, such as "Red" (always block) for blacklisted items, "Yellow" (allow only with user permission) for graylisted items, or "Green" (always allow) for whitelisted items, or a multi-faceted numeric score with a plurality of dimensions representing different variables such as "block," "allow," "seek user input," "seek administrator input," or similar.

Whitelisting may be particularly useful in application installs, wherein user-space applications are installed on a machine. More generally, if a certain set of actions are known, within an acceptable degree of certainty, to be safe with certain applications, then those actions may be whitelisted with those applications. This helps to avoid unnecessary solicitations for user input. In contrast, lower-level operations may be "graylisted." For example, a firmware update may require special permission from an administrator, so that even a user alone cannot do it.

In the foregoing of a grayware application, the vulnerability assessment engine may intercept the process's attempt to cull contacts and personal information from the user, and tag the attempted action as "Yellow." The vulnerability assessment engine may then solicit user input. If the user verifies the action, then the process is permitted to proceed. If the user disallows the action, then it may be blocked. In this case, appropriate action may be taken such as temporarily or permanently disabling the network connection for that process only, or setting up a circular buffer that mimics a backend server, so that the process is not notified that the attempted action has been blocked.

Actions may include, by way of non-limiting example, for both installed application or newly downloaded files, accessing, reading, updating, deleting system files or other application files, accessing, reading, updating, or deleting registry entries on Windows machines or configuration files on Unix-like machines, periodically contacting a remote server to HTTP POST or send system-related information, or download and install files from a remote server. Any such action may be reported to the backend server. The backend server may then consult a global threat intelligence (GTI) or similar database or provide the executable object to a research team for more in-depth analysis.

Advantageously, the vulnerability assessment engine disclosed herein may avoid certain false positives that otherwise may occur. For example, if an executable object is pre-fetched into memory but has not yet attempted any useful work, there may be no benefit to seeking user permission. Since the vulnerability assessment engine assigns reputations to tasks rather than to processes en grosse, intervention may be deferred until the process takes a suspicious action.

Figure 1:
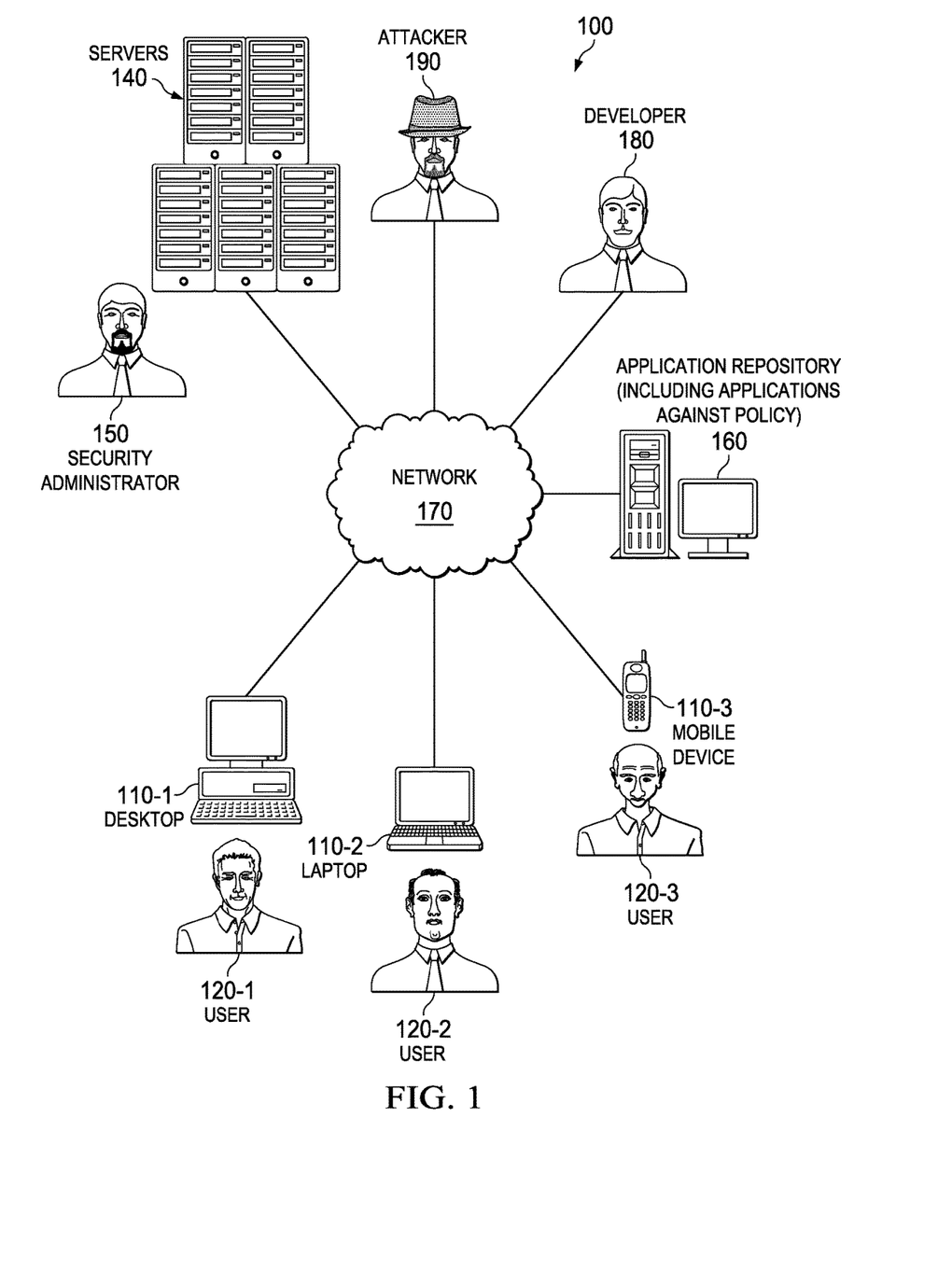
FIG. 1 is a network diagram of a distributed computing network according to one or more examples of the present Specification.

FIG. 1 is a network level diagram of a distributed security network 100 according to one or more examples of the present Specification. In the example of FIG. 1, a plurality of users 120 operate a plurality of computing devices 110. Specifically, user 120-1 operates desktop computer 110-1. User 120-2 operates laptop computer 110-2. End user 120-3 operates mobile device 110-3. Each computing device may include an appropriate operating system, such as Microsoft Windows, Linux, Android, Mac OSX, Apple iOS, Unix, or similar. Some of the foregoing may be more often used on one type of device than another. For example, desktop computers, which may also be engineering workstations, may be more likely to use one of Microsoft Windows, Linux, Unix, or Mac OSX. Laptop computer 110-2, which is usually a more-portable off-the-shelf device with minimal customization, may be more likely to run Microsoft Windows or Mac OSX. Mobile device 110-3 may be more likely to run Android or iOS. However, these examples are not intended to be limiting.

Computing devices 110 may be communicatively coupled to one another and to other network resources via network 170. Network 170 may be any suitable network or combination of networks, including for example, a local area network, a wide area network, a wireless network, a cellular network, or the Internet by way of nonlimiting example. Also connected to network 170 are one or more servers 140, an application repository 160, and human actors connecting through various devices, including for example a security administrator 150, an attacker 190, and a developer 180.

Servers 140 may be configured to provide suitable network services including certain services disclosed in one or more examples of the present Specification. In certain embodiments, servers 140 may also include remote or "cloud" services connected via one or more intermediaries.

It may be a goal of users 120 to successfully operate their respective computing devices 110 without interference from attacker 190 and developer 180. In one example, attacker 190 is a malware author whose purpose is to cause malicious harm or mischief. The malicious harm or mischief may take the form of installing root kits or other malware on computing devices 110 to tamper with the system, installing spyware or adware to collect personal and commercial data, defacing websites, operating a botnet, operating a spam server, or simply to annoy and harass users 120. To achieve these goals, attacker 190 may wish to install malware on one or more computing devices 110. As used throughout this Specification, malicious software ("malware") includes any virus, Trojan, zombie, rootkit, backdoor, worm, spyware, adware, ransomware, dialer, payload, malicious browser helper object, cookie, logger, or similar designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Developer 180 may also operate on network 170. Developer 180 may not have specific malicious intent, but may have interests adverse to users 120, or may develop software that poses a security risk. For example, a well-known and often exploited security flaw is the so-called buffer overrun, in which a malicious user such as attacker 190 is able to enter an overlong string into an input form and thus gain the ability to execute arbitrary instructions or operate with elevated privileges on a computing device 110. Buffer overruns may be the result, for example, of poor input validation or incomplete garbage collection, and in many cases arise in nonobvious contexts. Thus, although not malicious himself, developer 180 may provide an attack vector for attacker 190. Applications developed by developer 180 may also cause inherent problems, such as crashes, data loss, or other undesirable behavior. In another example, developer 180 develops software that may qualify as grayware, in which the software itself provides a useful function, but also is excessively intrusive, for example to monetize information from user 120.

Developer 180 may host software himself, or may upload his software to an application repository 160. Because software from developer 180 may be desirable itself, it may be beneficial for developer 180 to occasionally provide updates or patches that repair vulnerabilities as they become known.

Application repository 160 may represent an "app store," a software repository such as those commonly used for Unix and Linux environments, or other network service providing users 120 the ability to interactively or automatically download and install applications on computing devices 110. In a broader sense, the Internet may be thought of as a very large, distributed application repository 160. Thus, in some embodiments, application repository 160 may be centrally controlled, in others it may be non-centralized, or it may be a combination of both. Developer 180 and attacker 190 may both provide software via application repository 160. If application repository 160 has security measures in place that make it difficult for attacker 190 to distribute overtly malicious software, attacker 190 may instead stealthily insert vulnerabilities into apparently-beneficial applications.

In some cases, one or more users 120 may belong to an enterprise, which may include enterprise servers 140. One or more security administrators 150 may administer enterprise servers 140, and may also be responsible for defining and/or enforcing enterprise computing policies via network and software policies. For example, the enterprise may provide policy directives that restrict the types of applications that can be installed on enterprise computing devices 110, and may bar or limit installation of applications from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer.

In another example, user 120 may be a parent of young children, and wish to protect the young children from undesirable content, such as pornography, adware, spyware, age-inappropriate content, advocacy for certain political, religious, or social movements, and forums for discussing illegal or dangerous activities, by way of non-limiting example. In that case, the parent may assume the role of security administrator 150, and may define and enforce computing policies for the home.

Collectively, the malware, grayware, software against policy, and other content described above may be referred to as "potentially unwanted content" (PUC). In an example, it is a goal of users 120 to configure and operate computing devices 110 while limiting or eliminating PUC, and it is a goal of security administrators 150 to craft and enforce policies that prevent PUC from infecting and operating on network 170. To this end, computing devices 110 may include services for identifying and eliminating PUC, and servers 140 may provide additional network-based services that are configured to enforce policies, and otherwise assist computing devices 110 in excluding PUC.

In an example of the present architecture, a computing device 110 is provisioned with a shim application that communicates with a server 140. The shim application may be configured specifically to intercept execution of new processes and in particular installation of new applications by intercepting API calls and system calls made by executable objects. The shim application may be inserted into an operational stack, for example via operating system hooks, so that it runs seamlessly and invisibly to applications or processes executing at the application level. When a user attempts to launch an application, and in particular an installer, the shim application may collect suitable metrics to determine whether the application should be allowed. In some cases, those metrics may also cause the shim application to query a server 140 to determine whether there are any restrictions on the application, such as enterprise policy restrictions, household restrictions, or restrictions based on the application being tagged as potentially unwanted content. Depending on the reputation of the object, the same application may seamlessly allow the execution, may silently block the execution, may block the execution with a warning to the user, or may request additional verification from the user before permitting the execution to proceed. The shim application may also start monitoring the executable object for activities like accessing/reading/updating/deleting system files or other application files or accessing/reading/updating/deleting registry entry on Windows machines or system files on Unix-like machines, or if its periodically contacting remote server to POST/Send system related information or download and install files from remote servers, by way of non-limiting example. It will be recognized that other potential actions may also be taken, and all such suitable actions are intended to be encompassed within the broad scope of the present Specification.

Figure 2:
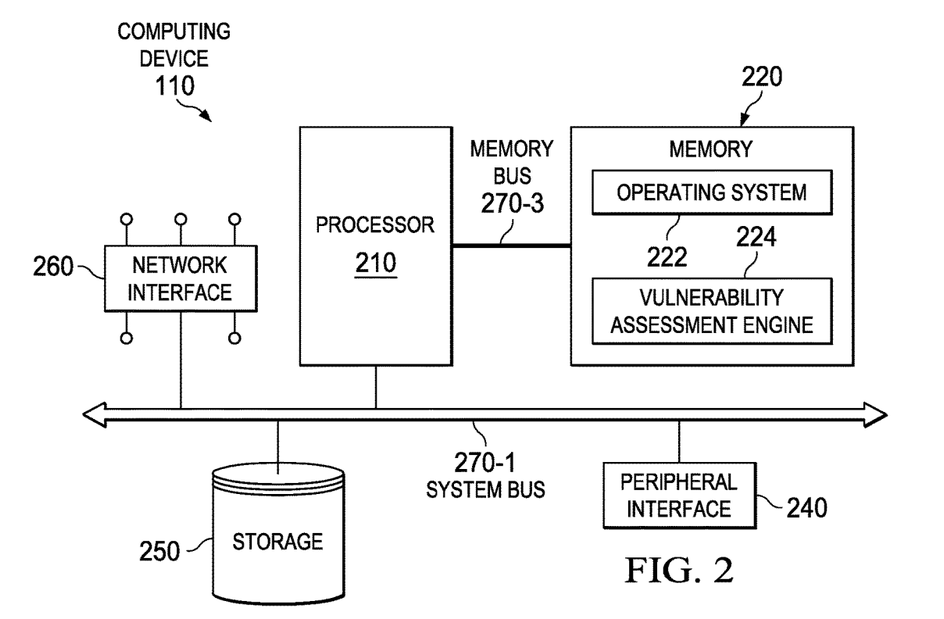
FIG. 2 is a block diagram of a computing device according to one or more examples of the present Specification.

FIG. 2 is a block diagram of client device 110 according to one or more examples of the present Specification. Client device 110 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data Client device 110 includes a processor 210 connected to a memory 220, having stored therein executable instructions for providing an operating system 222 and vulnerability assessment engine 224. Other components of client device 110 include a storage 250, network interface 260, and peripheral interface 240.

In an example, processor 210 is communicatively coupled to memory 220 via memory bus 270-3, which may be for example a direct memory access (DMA) bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of vulnerability assessment engine 224. Many other configurations are also possible, and are intended to be encompassed within the broad scope of this Specification.

Network interface 260 may be provided to communicatively couple client device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 4:
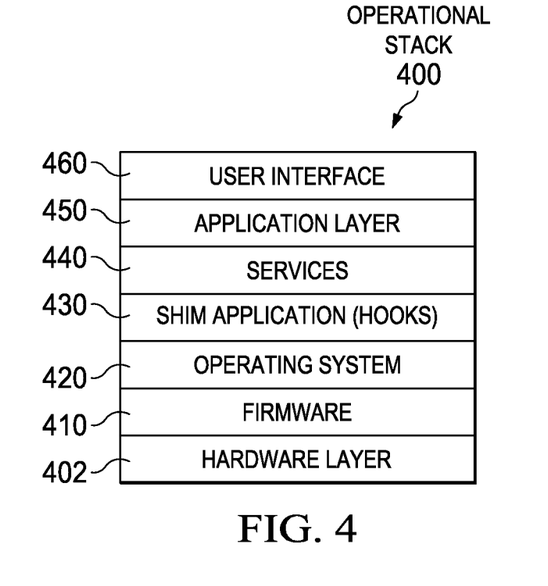
FIG. 4 is a block diagram of an operational stack according to one or more examples of the present Specification.

Vulnerability assessment engine 224, in one example, is a utility or program that carries out a method, such as method 400 of FIG. 4, or other methods according to this Specification. Vulnerability assessment engine 224 may be, in various embodiments, embodied in hardware, software, firmware, or some combination thereof. For example, in some cases, vulnerability assessment engine 224 may include a special integrated circuit designed to carry out a method or a part thereof, and may also include software instructions operable to instruct a processor to perform the method. In some cases, vulnerability assessment engine 224 may run as a "daemon" process with elevated system privileges. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that vulnerability assessment engine 224 is provided by way of non-limiting example only, and that other hardware and software, including interactive or user-mode software, may also be provided in conjunction with, in addition to, or instead of vulnerability assessment engine 224 to perform methods according to this Specification.

In one example, vulnerability assessment engine 224 includes executable instructions stored on a non-transitory medium operable to perform method 400 of FIG. 4, or a similar method according to this Specification. At an appropriate time, such as upon booting client device 110 or upon a command from operating system 222 or a user 120, processor 210 may retrieve a copy of vulnerability assessment engine 224 (or software portions thereof) from storage 250 and load it into memory 220. Processor 210 may then iteratively execute the instructions of vulnerability assessment engine 224.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
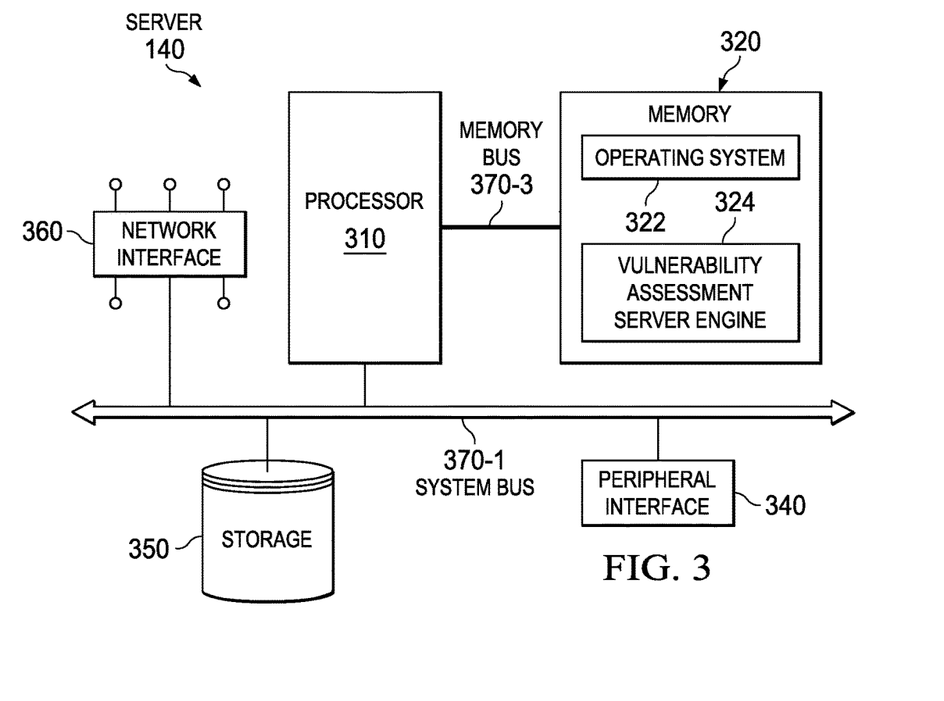
FIG. 3 is a block diagram of a server computing device according to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise.

Server 140 includes a processor 310 connected to a memory 320, having stored therein executable instructions for providing an operating system 322 and vulnerability assessment server engine 324. Other components of server 140 include a storage 350, network interface 360, and peripheral interface 340.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, as described in connection with memory 220 of FIG. 2. In certain embodiments, memory 320 may comprise a relatively low-latency volatile main memory, while storage 350 may comprise a relatively higher-latency non-volatile memory. However, memory 320 and storage 350 need not be physically separate devices, as further described in connection with FIG. 2.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of vulnerability assessment server engine 324. Many other configurations are also possible, and are intended to be encompassed within the broad scope of this Specification.

Network interface 360 may be provided to communicatively couple server 140 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 5:
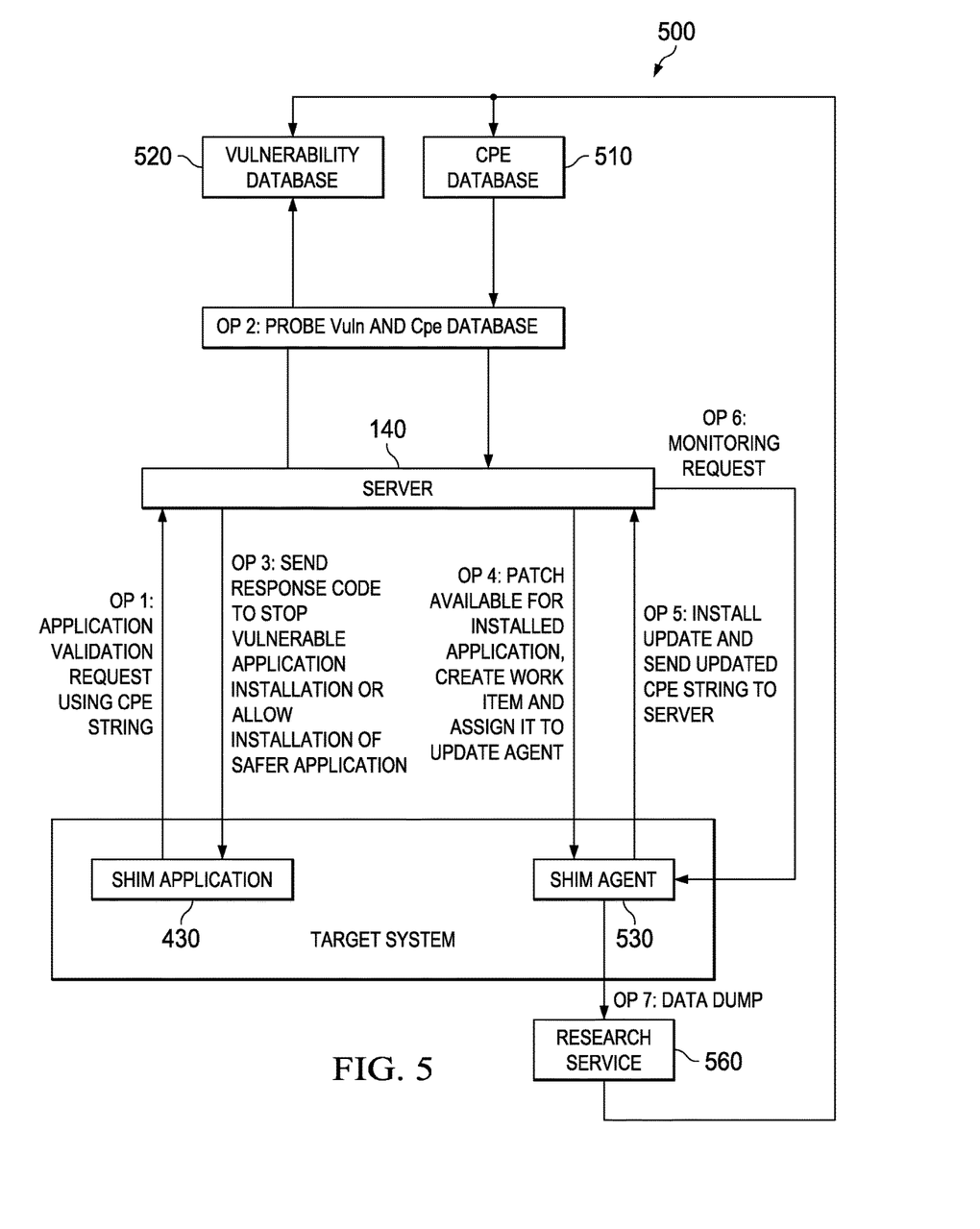
FIG. 5 is a signal flow diagram of a security method according to one or more examples of the present Specification.

Vulnerability assessment server engine 324, in one example, is a utility or program that carries out a method, such as method 500 of FIG. 5, or other methods according to this Specification. Vulnerability assessment server engine 324 may be, in various embodiments, embodied in hardware, software, firmware, or some combination thereof. For example, in some cases, vulnerability assessment server engine 324 may include a special integrated circuit designed to carry out a method or a part thereof, and may also include software instructions operable to instruct a processor to perform the method. In some cases, vulnerability assessment server engine 324 may run as a daemon process, as described above. It should also be noted that vulnerability assessment server engine 324 is provided by way of non-limiting example only, and that other hardware and software, including interactive or user-mode software, may also be provided in conjunction with, in addition to, or instead of vulnerability assessment server engine 324 to perform methods according to this Specification.

In one example, vulnerability assessment server engine 324 includes executable instructions stored on a non-transitory medium operable to perform method 500 of FIG. 5, or a similar method according to this Specification. At an appropriate time, such as upon booting server 140 or upon a command from operating system 322 or a user 120, processor 310 may retrieve a copy of vulnerability assessment server engine 324 (or software portions thereof) from storage 350 and load it into memory 320. Processor 310 may then iteratively execute the instructions of vulnerability assessment server engine 324.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. In some cases, a peripheral may be a computing device in its own right. Peripherals may include, by way of non-limiting examples, any of the devices discussed in connection with peripheral interface 240 of FIG. 2.

FIG. 4 is a block diagram disclosing an example operational stack 400 according to one or more examples of the present Specification. According to the example of FIG. 4, operational stack 400 is divided into a plurality of discrete layers, in this example, seven. It should be noted that the seven layers are provided by way of example only, and that in some embodiments additional layers may be provided, while in other embodiments, layers may be removed. It should also be noted that the disclosed layers provide merely a logical stratification of functions that facilitate programming and administering a computer. The layers need not be provided in separate hardware and software, and in some cases the boundary between layers may be somewhat fuzzy. There may also be some overlap between layers and interconnections between noncontiguous layers. Thus, it should be appreciated that this architecture is provided only for the purpose of facilitating discussion herein, and is not intended to limit the scope of the present Specification or the appended claims.

In one example, the hierarchy of layers disclosed in operational stack 400 represents decreasing levels of operational privileges, going from the bottom (hardware layer 402, most privileged) to the top (user interface 460, least privileged). As a non-limiting example, each layer may provide a hardware and/or software interface, such as an application programming interface, by which a layer above may issue commands or instructions. In other words, at hardware layer 402, devices are privileged to perform any operation they are capable of performing, and provide certain instructions or signals that firmware 410 may issue to instruct hardware layer 402 to perform some or all of those functions. At user interface layer 460, software is privileged only to provide certain permissible instructions, such as by sending signals or commands to application layer 450. As discussed above, the stratification of operational stack 400 is provided as an example only, and in some cases layers of privilege may overlap, such as in a case where a user interface 460 has certain privileges not granted to an application at application layer 450.

In this example, layer 402 is a hardware layer. Layer 402 may consist of physical hardware such as microchips, discrete devices, and related interconnects. Hardware layer 402 may be analog, digital, mixed analog and digital, or any other suitable hardware architecture.

Above layer 402 is a firmware layer. Firmware layer 410 may include suitable executable instructions encoded on a nonvolatile memory, such as a flash memory, bios, or other suitable low-level storage device. Firmware layer 410 may provide basic operational instructions for hardware layer 402, enabling hardware to perform intended functions with some degree of flexibility. In one example, firmware layer 410 may only be modified by a special operation, such as inserting a physical device into a computer, or flashing a memory.

On the layer above firmware layer 410 is an operating system 420. Operating system 420 may provide low-level services, such as hardware drivers including common interfaces so that user-space programs may not be aware of or concerned with the specific hardware which is executing. Operating system 420 may also perform scheduling, provide priority to processes, and otherwise provide useful functions.

Shim application 430 may be inserted, for example via operating system hooks, directly above operating system 420 and with elevated system privileges. Shim application 430 may operate seamlessly with operating system 420, and may be configured to be completely invisible to user space applications. Thus, a user 120 need not be concerned with the operation of shim application 430, and less direct intervention is required from user 120, such as an input confirming that an operation should be performed even though the operation Is suspect. Shim application 430 may further interact with a higher level service configured to provide cooperation with shim application 430. The high level service may operate at the level of services 440.

In an example, services 440 include programs that run as "daemon" processes as described above. Services 440 may provide useful operations such as file management, database management, network management, file servers, Web servers, system monitoring, or any other suitable background services to provide for computing device 110. Above the level of services 440 is an application layer 450. Application layer 450 provides user-space applications, including office applications, games, communication applications, engineering applications, or any other suitable applications that user 120 may desire to run on computing device 110.

Above the layer of applications 450 is a user interface 460 which provides interactive tools for interfacing with user 120. This may include, for example, a graphical user interface, a textual user interface, a command line interface, or other suitable interface. In some examples, human interface devices may interface with computing device 110 via peripherals connected to peripheral interface 240 of FIG. 2.

FIG. 5 is a signal flow diagram 500 of interaction between shim application 430, a shim agent 530, and a server 140 according to one or more examples of the present Specification. It should be noted that the signal flow is described in connection with a particular order of operations. It is not intended, however, that the order of operations illustrated herein be limiting. In suitable cases, certain operations may be performed in order otherwise than as specified herein, and in some embodiments, certain operations may be omitted as appropriate, while others may be inserted as necessary.

Other flow diagrams provided throughout this Specification are also not intended to be limiting.

It should also be noted that shim agent 530, as described in connection with FIG. 4, may operate at the level of, or with the privileges of, services 440, or in certain embodiments at application layer level 450. This is also intended to be provided by way of illustration only, and is not intended to be limiting. In this example, at operation 1, shim application 430 sends to server 140 an application validation request.

This application validation request may include a CPE-like string as described herein. As used in this Specification, a "CPE-like" string may include a format similar to the industry-standard CPE string, but with variations appropriate to this Specification. Example CPE-like strings may be of the form "Unique-Identifier/Vendor-name/(Application or file or OS) name/(Application or file or OS) Version/md5/sha1/file-size/(Digital Signature details)". For example, standard CPE strings may include the following:

```
cpe:/o:microsoft:windows_7:-:-:x64,cpe:/a:adobe:acrobat:9.3.3
cpe:/o:redhat:enterprise_linux:4:update5:ws,
cpe:/o:microsoft:windows_7:6.1:-:home_premium:en-us
cpe:/o:microsoft:windows_server_2008:r2:sp1:x64,
cpe:/a:microsoft:internet_explorer:9.0.8112.16421
cpe:/a:mozilla:thunderbird:0.7.3
cpe:/o:microsoft:windows_vista::sp1,
cpe:/a:microsoft:internet_explorer:7.0.5730
```

A CPE-like string of the present Specification may include the following:

```
(Identifier:SSWS112AS/Vendor:Adobe/Application-
name:acrobat_reader/Version:10.0/
md5:B01F5C6B23F5073228AA6D1E05579BE4/sha-
1:4F956CE4FD4D9BC7AD7950699B01E5DD45C52A8D/
fileSize:45056/(publiser:adobe))
(Identifier:SSWS112AS/Vendor:       Oracle/Application-
name:jre/Version:1.5.0:update_41
/md5:B01F5C6B23F5073228AA6D1E05579BE4/sha-
1:7F152BB66907E6F84BB77F0C29C1CCD12BE58C84/
fileSize:225056/(publiser:Oracle))
```

The foregoing CPE-like strings are provided by way of example only, and may be thought of as belonging to a broader class of platform identification strings. Other types of identification strings may be used, such as software identification (SWID) tags, or other identification types. Furthermore, the identification need not even be a string, but could be any arbitrary data structure crafted to provide the necessary information.

In operation 2, server 140 receives the application validation request from shim application 430, and constructs a reputation for the application. Constructing the reputation may include, for example, probing a CPE and/or vulnerability database 510 or 520. Further within operation two, server 140 may receive from the databases appropriate vulnerability and CPE data. In operation three, server 140 provides back to shim application 430 a response code. The response code may be intercepted to stop installation, execution, or any other suitable action of a vulnerable application, allow the action, or to warn the user and/or solicit additional verification.

In operation 4, server 140 determines whether any updates or patches are available for the requested application. If an update or patch is available, then in operation 4, server 140 provides to shim agent 530 a notification that a patch or update is available. Shim agent 530 may then assign the operation of downloading and installing the patch or update to another process, or create a work item to be executed later, such as at the next operating system boot time, or before closing the process. Note that in certain embodiments, shim agent 530 may also query server 140 for patches or updates periodically.

In operation 5, shim agent 530 may install appropriate updates or patches, and send an updated CPE-like string to server 140.

In operation 6, server 140 may instruct shim agent 530 to monitor certain executable objects. Responsive to this instruction, shim agent 530 may initiate monitoring, either itself, or via shim application 430. Advantageously, if shim application 430 performs the monitoring, it may do so with elevated privileges.

In operation 7, shim agent 530 may also perform a data dump to a research service 560, which may, for example, employ human analysts to analyze executable objects and classify them according to the analysts' expertise.

Figure 6:
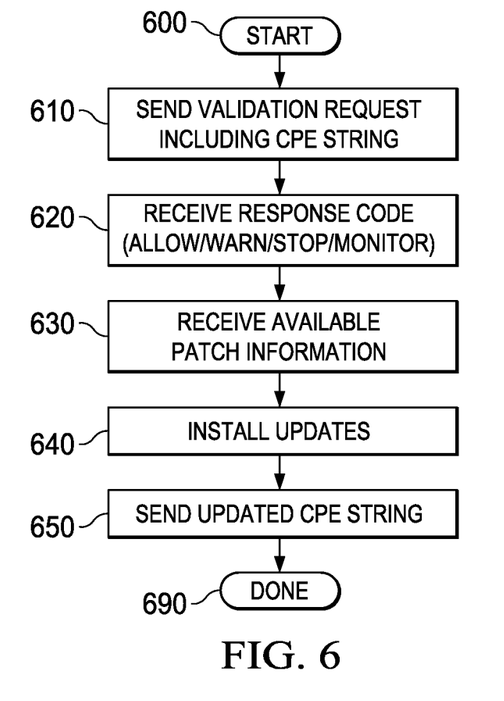
FIG. 6 is a flow chart of a method performed by a computing device according to one or more examples of the present Specification.

FIG. 6 is a flow chart of a method 600 performed on computing device 110 according to one or more examples of the present Specification. It should be noted that method 600 may be performed in whole or in part by one or both of shim application 430 and shim agent 530. It is anticipated that in designing a particular embodiment, the designer will make choices about the division of responsibilities between shim application 430 and shim agent 530 according to the specific design requirements of the application. Thus, it is not intended that the division of responsibilities described herein between shim application 430 and shim agent 530 be limiting. Rather, these are provided by way of illustration only.

At block 610, shim application 430 intercepts and temporarily blocks an action taken by the executable object such as launching, opening, executing, or other action disclosed herein. Also in block 610, computing device 110 sends to server 140 a validation request for a process, including a CPE-like string.

In block 620, computing device 110 receives from server 140 a response code, which may for example indicate a reputation that corresponds to one of allow, warn, stop, or monitor. This response code corresponds to a reputation for the executable object. If the reputation is "high" or "good," then the response code may be "green" or "allow." If the reputation is "low" or "bad," then the response code may be "red" or "block." An intermediate response code may receive a value such as "yellow" or "orange," with a "warn" action. Reputation may be based on previous encounters with the executable object in the enterprise environment. A "warn" condition may occur for numerous conditions, such as if server 140 has insufficient data to assign a reliable reputation. In this case, the response code may instruct computing device 110 to allow the action, but instruct shim agent 530 to enable monitoring so that the activities can be monitored and reported. In another case, server 140 reports that there is a vulnerability, but it is not severe. In that case, execution may be allowed, but shim agent 530 may be instructed to download and install a patch as soon as possible, or whenever available.

In another example, server 140 may not have sufficient information on the reputation of a particular executable object to make a useful decision about how to treat it. In that case, the response code may be "monitor," in which case shim agent 530 will begin monitoring the executable object's behavior. After collecting data on the executable object's behavior, shim agent 530 may upload the data to research service 560 for further analysis and categorization. In some cases, monitoring may be ongoing, and shim agent 530 may upload data more than once.

In block 630, computing device 110 receives from server 140 available patch information as described herein.

In block 640, computing device 110 installs updates as necessary.

In block 650, computing device 110 sends to server 140 it's updated CPE-like string, reflecting installation of the patch.

In block 690, the method is done.

Figure 7:
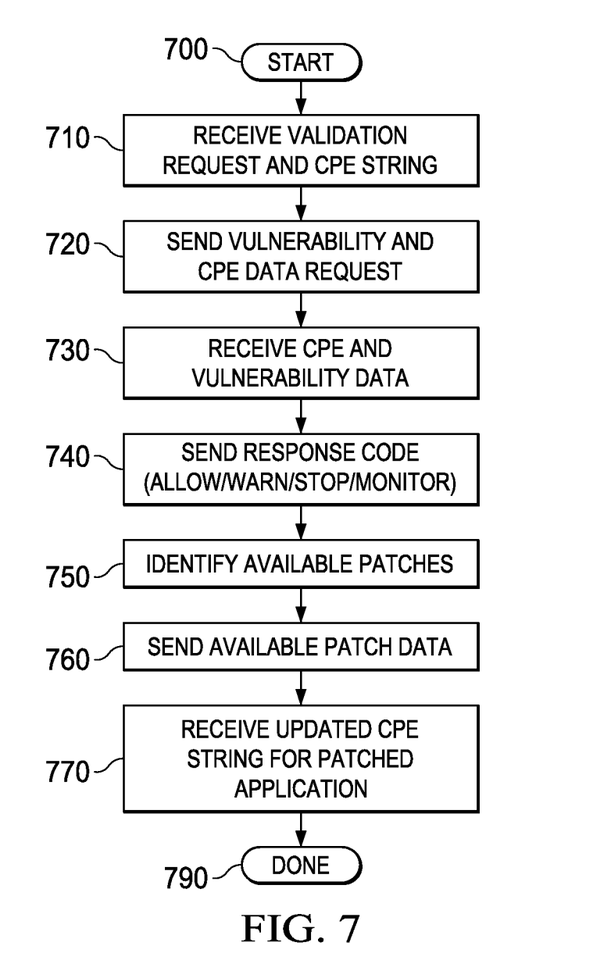
FIG. 7 is a flow chart of a method performed by a server computing device according to one or more examples of the present Specification.

FIG. 7 is a flow chart of a method 700 performed by server 140 according to one or more examples of the present Specification. It should be noted that by way of example, this Specification describes only one vulnerability assessment server engine 324 operating on server 140. It should be noted, however, that this is a nonlimiting example only, and that other architectures are available. For example, the operations of method 700 may be distributed across a plurality of servers, in which each server performs only a portion of the method. It is anticipated that at design time, the designer of a specific embodiment will make decisions about which servers perform which operations based on the demands of the embodiment. It should also be noted that server 140 operates separately from computing device 110 by way of example only. In some cases, vulnerability assessment server engine 324 may be provided on the same physical device as computing device 110. For example, vulnerability assessment server engine 324 may be provided as additional hardware and/or software. In another example, server 140 may be a virtual machine operating on the same physical hardware as a virtual machine providing computing device 110. Thus, it should be noted herein that the division of responsibilities between computing device 110 and server 140 are provided by way of example only, and are not intended to be limiting.

In block 710, server 140 receives a validation request and CPE-like string from computing device 110.

In block 720, server 140 sends a vulnerability and CPE-like data request to an appropriate database, which may be posted on a separate computing device, or which may be part of server 140.

In block 730, server 140 receives a CPE and vulnerability data from the database.

In block 740, server 140 computes a response code for the CPE-like string, and sends the response code to computing device 110. The response code may include, by way of nonlimiting example, instructions to allow, warn, or stop. In other examples, the response code need not expressly specify an action, but rather may contain a reputation score, from which computing device 110 may determine an appropriate action.

In block 750, server 140 identifies available patches for the process, for example by querying a patch or update database, or by performing an internet search for available patches and updates.

In block 760, server 140 sends to computing device 110 available patch data, which may include instructions for downloading and installing appropriate patch.

In block 770, server 140 receives from computing device 110 an updated CPE-like string for the patch application.

In block 790, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

Example Embodiments

There is disclosed in example 1, a computing device configured for pre-launch vulnerability assessment of executable objects, comprising: a network interface operable to communicatively couple the computing device to a server; and a vulnerability assessment engine operable for: sending over the network interface a validation request for an operation performable by an executable object; receiving a response code for the validation request; and acting according to the response code, wherein acting is operable to influence the operation performable by the executable object.

There is disclosed in example 2, the computing device of example 1, wherein the response code comprises a flag for one of allow, warn, stop, and monitor.

There is disclosed in example 3, the computing device of example 1, wherein acting according to the response code comprises taking an action selected from the group consisting of allowing the operation, allowing the operation with a warning to an end user, allowing the operation with a warning to a security administrator, allowing the operation only if a confirmation is received from an end user, allowing the operation only if a confirmation is received from a security administrator, allowing the operation unless a refusal is received from an end user, allowing the operation unless a refusal is received from a security administrator, blocking the action, providing a warning to an end user, providing a warning to a security administrator, creating a log entry, updating a whitelist, updating a blacklist, updating a gray list, monitoring the executable object, and reporting information about behavior of the executable object.

There is disclosed in example 4, the computing device of example 1, wherein sending the validation request comprises providing an identification packet for the computing device and executable object.

There is disclosed in example 5, the computing device of example 4, wherein the identification packet is a common platform enumeration-like string.

There is disclosed in example 6, the computing device of example 1, wherein the vulnerability assessment engine comprises a shim application operable to run with elevated system privileges.

There is disclosed in example 7, the computing device of example 6, wherein the shim application is operable for intercepting launching of a process invisibly to user-space applications.

There is disclosed in example 8, the computing device of example 1, wherein the vulnerability assessment engine comprises a shim application operable for executing with elevated privileges and intercepting launching of a process via operating system hooks.

There is disclosed in example 9, the computing device of example 1, wherein the vulnerability assessment engine comprises a shim agent operable to execute with substantially user-space privileges.

There is disclosed in example 10, the computing device of example 9, wherein the shim agent is operable for receiving a notification that a patch or update is available for the executable object, and for scheduling application of the patch or update.

There is disclosed in example 11, the computing device of example 10, wherein the shim agent is operable for sending over the network interface an identification packet for the computing device and executable object.

There is disclosed in example 12, the computing device of example 11, wherein the identification packet is a common platform enumeration-like string.

There is disclosed in example 13, the computing device of example 1, wherein the vulnerability assessment engine is operable for identifying and causing to be installed updates or patches for the executable object.

There is disclosed in example 14, one or more computer-readable mediums having stored thereon executable instructions operable for instructing a processor to provide a vulnerability assessment engine, comprising: sending over the network interface a validation request for an operation performable by an executable object; receiving a response code for the validation request; and acting according to the response code, wherein acting is operable to influence the operation performable by the executable object.

There is disclosed in example 15, the one or more computer-readable mediums of example 14, wherein the response code comprises a flag for one of allow, warn, stop, and monitor.

There is disclosed in example 16, the one or more computer-readable mediums of example 14, wherein acting according to the response code comprises taking an action selected from the group consisting of allowing the operation, allowing the operation with a warning to an end user, allowing the operation with a warning to a security administrator, allowing the operation only if a confirmation is received from an end user, allowing the operation only if a confirmation is received from a security administrator, allowing the operation unless a refusal is received from an end user, allowing the operation unless a refusal is received from a security administrator, blocking the action, providing a warning to an end user, providing a warning to a security administrator, creating a log entry, updating a whitelist, updating a blacklist, updating a gray list, monitoring the executable object, and reporting information about behavior of the executable object.

There is disclosed in example 17, the one or more computer-readable mediums of example 14, wherein sending the validation request comprises providing an identification packet for the computing device and executable object.

There is disclosed in example 18, the one or more computer-readable mediums of example 17, wherein the identification packet is a common platform enumeration-like string.

There is disclosed in example 19, the one or more computer-readable mediums of example 14, wherein the vulnerability assessment engine comprises a shim application operable to run with elevated system privileges.

There is disclosed in example 20, the one or more computer-readable mediums of example 19, wherein the shim application is operable for intercepting launching of a process invisibly to user-space applications.

There is disclosed in example 21, the one or more computer-readable mediums of example 14, wherein the vulnerability assessment engine comprises a shim agent operable to execute with substantially user-space privileges.

There is disclosed in example 22, the one or more computer-readable mediums of example 21, wherein the shim agent is operable for receiving a notification that a patch or update is available for the executable object, and for scheduling application of the patch or update.

There is disclosed in example 23, the one or more computer-readable mediums of example 22, wherein the shim agent is operable for sending over the network interface common platform enumeration-like string for the computing device and executable object.

There is disclosed in example 24, a vulnerability assessment server comprising: a network interface; and a vulnerability assessment server engine operable for: receiving on the network interface a validation request for an executable object, the validation request comprising a common platform enumeration-like string identifying the executable object and a computing device originating the validation request; querying a vulnerability database and a common platform enumeration database for characterizing the executable object; and sending over the network interface a response code to the validation request, the response code belonging to a class selected from the group consisting of allow, stop, warn, and monitor.

There is disclosed in example 25, the vulnerability assessment server of example 24, wherein the vulnerability assessment server engine is further operable for: identifying an available update or patch for the executable object; sending a notification of the available update or patch on the network interface; and receiving an updated common platform enumeration-like string for the executable object, wherein the updated common platform enumeration-like string includes the update or patch.

There is disclosed in an example 26, a method of performing the operations of the vulnerability assessment engine of any of examples 1-13.

There is disclosed in an example 27, a method of performing the operations of the instructions of any of examples 14-23.

There is disclosed in an example 28, one or more computer-readable mediums for instructing a processor to carry out any of the methods of example 26.

There is disclosed in an example 29, an apparatus operable comprising means for performing the method or executing the instructions of any of examples 26, 27, and 28.

There is disclosed in an example 30, the apparatus of example 29, wherein means comprise a processor and a memory.

What is claimed is:

1. A computing device configured to provide security monitoring with reduced interference to user operation, comprising:
   a network interface configured to communicatively couple the computing device to a server; and
   one or more logic elements, including at least one hardware logic element, comprising a vulnerability assessment engine comprising a shim application to be inserted via operating system hooks to run invisibly to applications running at an application level, the vulnerability assessment engine configured to:
      intercept via the shim application a non-prelaunch runtime operation of an executable object;
      send via the network interface a validation request for the runtime operation in context of the executable object;
      receive a response code for the validation request, the response code comprising a common platform enumeration (CPE)-like string comprising a reputation for the runtime operation; and
      act according to the response code, blocking the runtime operation by the executable object.

2. The computing device of claim 1, wherein the response code comprises a flag for one of allow, warn, stop, and monitor.

3. The computing device of claim 1, wherein acting according to the response code comprises taking an action selected from the group consisting of allowing the runtime operation, allowing the runtime operation with a warning to an end user, allowing the runtime operation with a warning to a security administrator, allowing the runtime operation only if a confirmation is received from an end user, allowing the runtime operation only if a confirmation is received from a security administrator, allowing the runtime operation unless a refusal is received from an end user, allowing the runtime operation unless a refusal is received from a security administrator, blocking the action, providing a warning to an end user, providing a warning to a security administrator, creating a log entry, updating a whitelist, updating a blacklist, updating a gray list, monitoring the executable object, and reporting information about behavior of the executable object.

4. The computing device of claim 1, wherein sending the validation request comprises providing an identification packet for the computing device and executable object.

5. The computing device of claim 4, wherein the identification packet is a CPE-like string.

6. The computing device of claim 1, wherein the shim application is configured to run with elevated system privileges.

7. The computing device of claim 1, wherein the shim application is configured to intercept launching of a process invisibly to user-space applications.

8. The computing device of claim 1, wherein the vulnerability assessment engine further comprises a shim application configured to execute with elevated privileges and intercept launching of a process via operating system hooks.

9. The computing device of claim 1, wherein the vulnerability assessment engine comprises a shim agent configured to execute with substantially user-space privileges.

10. The computing device of claim 9, wherein the shim agent is configured to receive a notification that a patch or update is available for the executable object, and to schedule application of the patch or update.

11. The computing device of claim 10, wherein the shim agent is configured to send over the network interface an identification packet for the computing device and executable object.

12. The computing device of claim 11, wherein the identification packet is a CPE-like string.

13. The computing device of claim 1, wherein the vulnerability assessment engine is further configured to identify and cause to be installed updates or patches for the executable object.

14. One or more tangible, non-transitory computer-readable mediums having stored thereon executable instructions configured to instruct a processor to provide a vulnerability assessment engine comprising a shim application to be inserted via operating system hooks to run invisibly to applications running at an application level, the vulnerability assessment engine configured to provide security monitoring with reduced interference to user operation, comprising instructions for:
   intercepting via the shim application a non-prelaunch runtime operation of an executable object;
   sending via the network interface a validation request for the runtime operation in context of the executable object;
   receiving a response code for the validation request, the response code comprising a common platform enumeration (CPE)-like string comprising a reputation for the runtime operation; and
   acting according to the response code, blocking the runtime operation by the executable object.

15. The one or more computer-readable mediums of claim 14, wherein the response code comprises a flag for one of allow, warn, stop, and monitor.

16. The one or more computer-readable mediums of claim 14, wherein acting according to the response code comprises taking an action selected from the group consisting of allowing the runtime operation, allowing the runtime operation with a warning to an end user, allowing the runtime operation with a warning to a security administrator, allowing the runtime operation only if a confirmation is received from an end user, allowing the runtime operation only if a confirmation is received from a security administrator, allowing the runtime operation unless a refusal is received from an end user, allowing the runtime operation unless a refusal is received from a security administrator, blocking the action, providing a warning to an end user, providing a warning to a security administrator, creating a log entry, updating a whitelist, updating a blacklist, updating a gray list, monitoring the executable object, and reporting information about behavior of the executable object.

17. The one or more computer-readable mediums of claim 14, wherein sending the validation request comprises providing an identification packet for the computing device and executable object.

18. The one or more computer-readable mediums of claim 17, wherein the identification packet is a CPE-like string.

19. The one or more computer-readable mediums of claim 14, wherein the shim application is configured to run with elevated system privileges.

20. The one or more computer-readable mediums of claim 14, wherein the shim application is configured to intercept launching of a process invisibly to user-space applications.

21. The one or more computer-readable mediums of claim 14, wherein the vulnerability assessment engine comprises a shim agent configured to execute with substantially user-space privileges.

22. The one or more computer-readable mediums of claim 21, wherein the shim agent is configured to receive a notification that a patch or update is available for the executable object, and to schedule application of the patch or update.

23. The one or more computer-readable mediums of claim 22, wherein the shim agent is configured to send over the network interface a CPE-like string for the computing device and executable object.

24. A method of providing security monitoring with reduced interference to user operation, comprising:
Intercepting, via a shim application to be inserted via operating system hooks to run invisibly to applications running at an application level, a non-prelaunch runtime operation of an executable object;
sending over a network interface a validation request for the runtime operation in context of the executable object;
receiving a response code for the validation request, the response code comprising a common platform enumeration (CPE)-like string comprising a reputation for the runtime operation; and,
according to the response code, blocking the runtime operation by the executable object.

25. The method of claim 24, wherein a vulnerability assessment engine is configured to, according to the response code, allow the runtime operation by the executable object.

26. The method of claim 24, further comprising, according to the response code, allowing the runtime operation by the executable object.

27. The one or more computer-readable mediums of claim 14, wherein the instructions are further configured to, according to the response code, allow the runtime operation by the executable object.

* * * * *